Jan. 19, 1937.   R. J. BUSH   2,068,370
INERTIA OPERATED CONTROL DEVICE
Filed Feb. 27, 1934   2 Sheets-Sheet 2
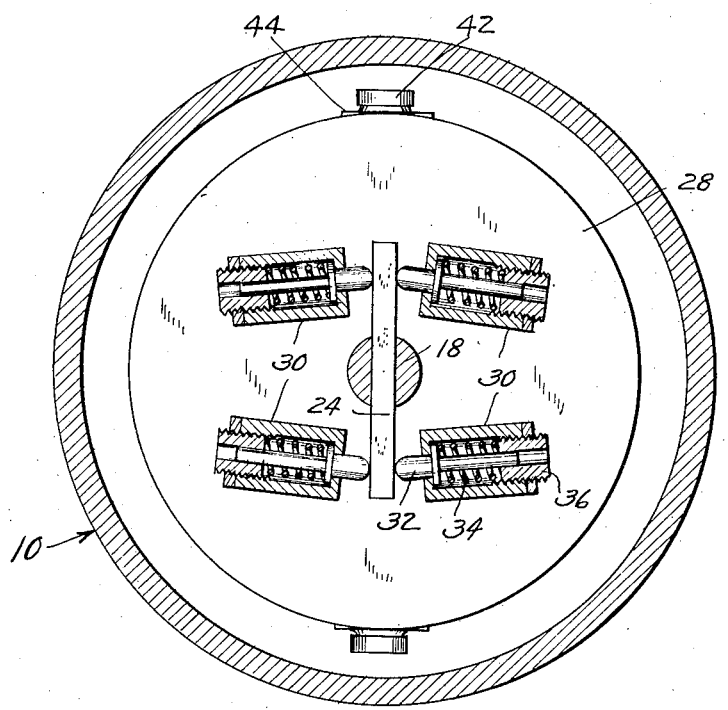
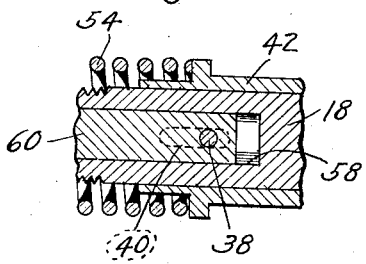
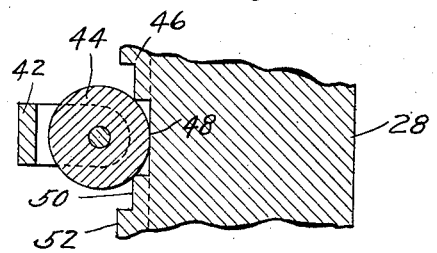
INVENTOR
RANKIN J. BUSH
BY
*Wm. M. Cady*
ATTORNEY Patented Jan. 19, 1937

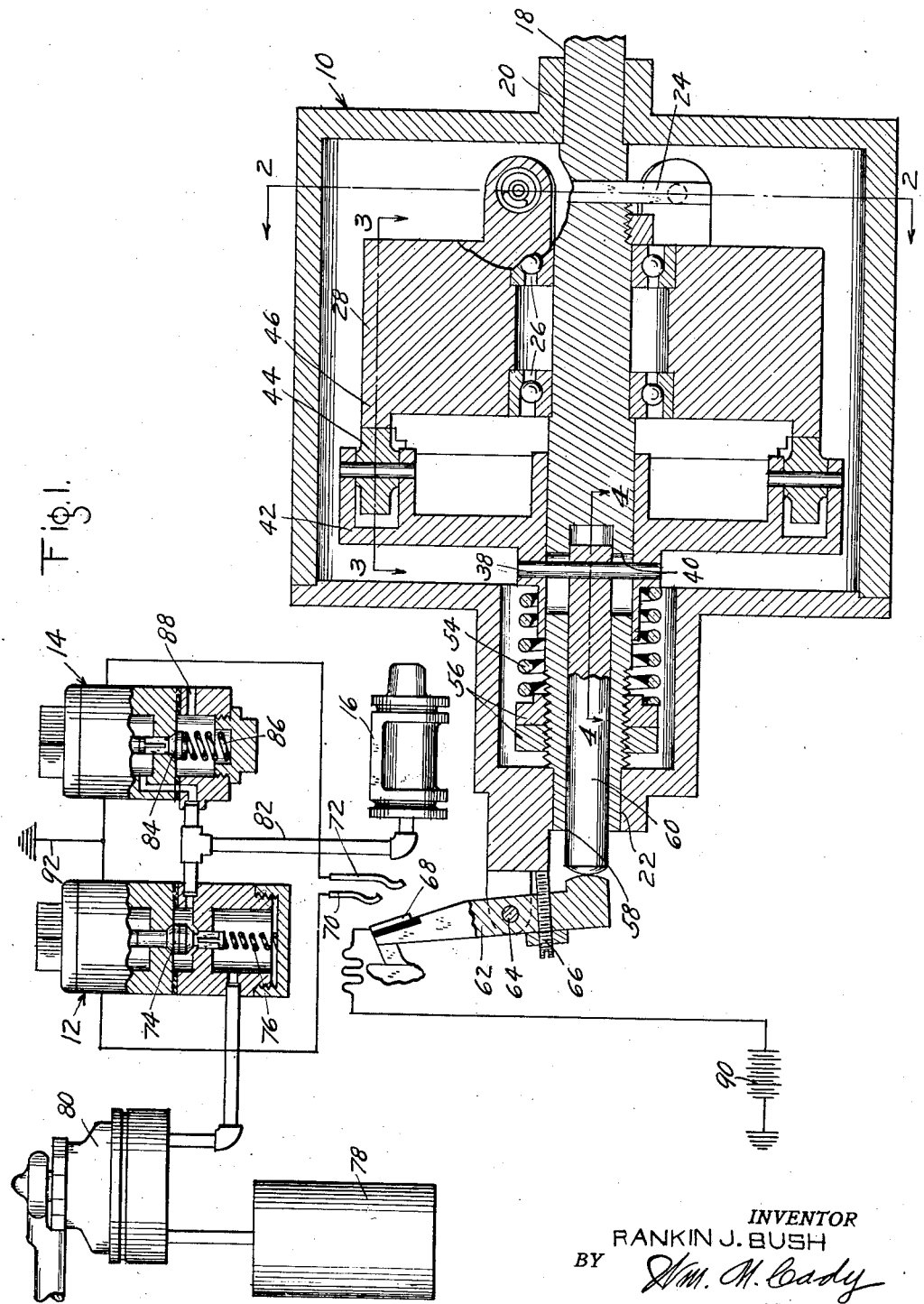

2,068,370

UNITED STATES PATENT OFFICE 2,068,370

INERTIA OPERATED CONTROL DEVICE

Rankin J. Bush, Jeannette, Pa., assignor to The Westinghouse Air Brake Company, Wilmerding, Pa., a corporation of Pennsylvania Application February 27, 1934, Serial No. 713,103

19 Claims. (Cl. 303—24)

This invention relates to inertia operated control devices, and more particularly to control devices for controlling the acceleration and deceleration of railway vehicles and trains.

It is a well known fact that when an attempt is made to accelerate or decelerate a vehicle or train at a rate greater than that which is permissible according to track conditions, the wheels will slide. Sliding wheels are objectionable due to the uneven wear caused. Heretofore, various devices have been proposed for limiting the rate of acceleration and the rate of deceleration to values which will not cause wheel sliding.

It is a principal object of my invention to provide an improved form of inertia operated control device for controlling either the rate of acceleration or the rate of deceleration, or both.

A further object of my invention is to provide a control device for controlling either acceleration or deceleration which depends for its operation upon relative or differential movements of rotating bodies.

A yet further object of my invention is to provide an inertia operated control device which may be employed as either an acceleration or deceleration controller, or as a means for detecting and relieving wheel sliding.

Yet further objects and advantages of my invention will be apparent from the following description, which is taken in connection with one embodiment thereof illustrated in the attached drawings, in which, Fig. 1 is a diagrammatic view of this embodiment, illustrated in connection with the control of the brakes on a vehicle.

Fig. 2 is a sectional view of the control device shown in Fig. 1, along the line 2—2.

Fig. 3 is another sectional view of a portion of the control device, taken along the line 3—3 of Fig. 1.

Fig. 4 is still another sectional view of a portion of the control device, taken along the line 4—4 of Fig. 1.

While this embodiment has been shown in connection with controlling operation of the brakes of a vehicle, it is to be understood that I do not intend to be limited to this particular application, but have shown it merely as an illustration of one adaptation.

As may be seen in Fig. 1, the inertia operated control device is shown at 10, arranged for controlling operation of a cut-off magnet valve device 12 and a release magnet valve device 14, both of which are provided to control the supply of fluid under pressure to and its release from a brake cylinder 16.

The control device 10 is embodied in a casing provided with a shaft 18 mounted in bearings at 20 and 22. The shaft 18 is intended to be coupled to an axle of the vehicle, or to a motor or other driving means connected to the axle, or it may form an extension of the axle itself, so that the shaft will rotate in accordance with rotation of the axle.

Rigidly secured to and rotatable with the shaft 18 is a member or body 24. Rotatably disposed on the shaft 18 through ball bearing 26, or other anti-friction means, is a larger body 28 in the form of a fly wheel. Carried by the fly wheel body 28 are four housings 30 containing plungers 32 urged outwardly of the housing by springs 34. An adjusting nut 36 is provided for regulating the tension or force with which the springs act upon the plungers.

The fly wheel body 28 is so disposed on the shaft 18 that the member 24 secured thereto is held between the ends of the plungers 32, as shown in Fig. 2.

When the shaft 18 is rotated, the member 24 imparts rotary motion to the fly wheel body 28 through contact with two of the plungers 32, the springs 34 associated with the plungers yielding when the inertia effect of the fly wheel body is such as to oppose changing speeds of the shaft, but not yielding appreciably so long as this effect is absent.

Also disposed on and secured to the shaft 18, by a pin 38 passing through a transverse slot 40 in the shaft, is a flanged member 42 carrying rollers 44 adapted to engage a peripheral cam 46 on the fly wheel body 28.

The cam 46 is provided with low portions 48, intermediate portions 50 and high portions 52, and while these portions have been shown as a step-like development, it is to be understood that I may use an inclined plane or curved development, or any other suitable shape which will perform the functions hereinafter described.

The flanged member 42 is urged toward the fly wheel body 28 by a spring 54 reacting against nuts 56 secured to the shaft 18, so that the rollers 44 will be held in contact with the cam 46.

The shaft 18 is provided with a bore 58, in which is disposed an operating shaft 60 through which the heretofore referred to pin 38 passes. As will hereinafter more fully be described, the operating shaft 60 is movable axially of the shaft 18 by movement of the flanged member 42, to operate a lever 62 pivotally mounted at 64 in the housing, and provided with an adjusting screw 66 for regulating movement of the lever.

Secured to the end of the lever 62 and insulated therefrom is a contact 68, which is adapted upon movement of the lever to successively engage stationary contacts 70 and 72, for a purpose which will appear presently.

The cut-off magnet valve device 12 is provided with a double beat valve 74 which is urged toward an upper seated position by a spring 76, and toward a lower seated position by an electromagnet in the upper portion of the magnet valve device casing which is energized when the aforementioned movable contact 68 engages the stationary contact 70.

When the double beat valve 74 is in upper seated position, fluid under pressure may flow from a reservoir 78 through a brake valve device 80, past the open lower seat below the double beat valve 74, and through pipe 82 to the brake cylinder 16.

When the double beat valve 74 is in lower seated position, this supply of fluid under pressure to the brake cylinder is cut off.

The release magnet valve device 14 is provided with a valve 84 which is urged toward seated position by a spring 86, and to unseated position by an electromagnet in the upper part of the magnet valve device casing, which is energized when the movable contact 68 engages the stationary contact 72.

When the valve 84 is in unseated position fluid pressure is released from the brake cylinder 16 to the atmosphere by way of pipe 82, past the unseated valve 84, and port 88. When the valve 84 is in seated position this communication with the atmosphere is cut off.

Current for energizing the electromagnets of the magnet valve devices may be supplied from any convenient source, such for example as a battery 90, one terminal of which has been shown connected to the movable contact 68, while the other terminal has been shown as grounded, to correspond to the grounded connection 92 of the electromagnets.

The brake valve device 80 may be of any of the usual types commonly employed to manually control the supply of fluid under pressure to and its release from a brake cylinder. For the purposes of this disclosure, it will be assumed that a rotary type brake valve device having the usual application, lap and release positions is employed.

In operation, when it is desired to effect an application of the brakes on a vehicle equipped with this embodiment, the handle of the brake valve device 80 is moved to application position, whereupon fluid under pressure flows from the reservoir 78, through the brake valve device 80, past the open lower seat of the magnet valve device 12, through pipe 82 to the brake cylinder 16. The brakes will, therefore, be applied in accordance with the fluid pressure built up in the brake cylinder 16.

Now when the vehicle is traveling at a substantially constant rate of speed, the member 24 secured to the shaft 18 of the control device 10 will impart rotary motion to the fly wheel body 28 through engagement with plungers 32. As long as the fly wheel body 28 and shaft 18 are urged to rotate at the same speed, springs 34 will not be appreciably compressed.

When, however, the brakes are applied, and the speed of shaft 18 is diminished, the body 28 tends to continue at the same speed as before the brakes were applied, due to its inertia effect. This tendency of the body 28 to overspeed is resisted by two of the springs 34, which are compressed an amount in accordance with the inertia effect caused by the differential of speed tendency between the body 28 and the shaft 18.

The compression of the springs 34 will, therefore, be proportional to the braking effect upon the shaft 18, and since the rate of retardation is also proportional to the braking effect, it will be obvious that the springs 34 may be adjusted so that a given deflection or compression of the springs results when the vehicle decelerates at a given rate.

When the springs 34 are compressed due to the inertia effect of the fly wheel body 28, the fly wheel body moves relative to the shaft 18, and the rollers 44 move from the low cam portions 48 to the intermediate cam portions 50, and if compression of the springs 34 is great enough, to the high cam portions 52.

When the rollers 44 move from the low portions 48 to the intermediate portions 50, the flanged member 42 is moved to the left, and in turn moves the operating shaft 60 to the left to swing lever 62 in a clockwise direction far enough for movable contact 68 to engage stationary contact 70. When this takes place, the electromagnet in the cut-off magnet valve device 12 is energized and the double beat valve 74 is urged to its lower seated position to cut off the supply of fluid under pressure to the brake cylinder.

When the rollers 44 move from the intermediate cam portions 50 to the high cam portions 52, the movable contact 68 is swung far enough to also engage the stationary contact 72, whereupon the electromagnet in the magnet valve device 14 is energized to unseat the valve 84. Unseating of this valve releases fluid pressure from the brake cylinder to the atmosphere.

It will thus be seen that tension of the springs 34 may be adjusted so that a given rate of retardation will cause sufficient differential movement between the fly wheel body 28 and the shaft 18 to compress the springs far enough to cause the supply of fluid to the brake cylinder to be cut off, and if the rate of retardation should exceed this value then a greater differential movement will result to cause fluid pressure to be released from the brake cylinder.

If when the brakes are applied, the wheels on the axle with which the shaft 18 is connected should begin to slip, then the inertia effect of the fly wheel body 28 will be such as to compress the springs 34 the maximum amount provided for, whereupon both magnet valve devices 12 and 14 will be immediately energized to cut off the supply of fluid to the brake cylinder and to release pressure therefrom until the braking force on the wheels will have been reduced to a point where the wheels commence to accelerate in speed.

As soon as the wheels commence to accelerate and the inertia effect on the fly wheel body 28 diminishes, the release of fluid pressure from the brake cylinders will be discontinued, and if the rate of retardation has dropped low enough fluid under pressure may again be supplied to the brake cylinder.

It is to be understood that when the braking force, due to brake cylinder pressure, exceeds that permitted by the adhesion between wheels and rails the wheels will begin to slip, i. e., reduce in speed toward zero speed, and unless the braking force is quickly reduced, the slipping wheel or wheels will reach a locked wheel stage, i. e., a sliding condition. The interval of time between the beginning of slipping and the actual sliding of a wheel is usually great enough to permit reducing the braking force sufficiently to relieve the slipping condition before the wheel actually slides. It is intended that the parts shall be designed or adjusted to accomplish this.

It will, therefore, be obvious that the control device will function not only to control the deceleration and acceleration of a vehicle, but may be employed to prevent wheel sliding.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake system in combination, a driving body, a driven body, resilient means for transmitting motion between said bodies and providing for different degrees of relative movement therebetween, an axially movable body, a cam on said driven body adapted to move said axially movable body upon relative movement between said driven and driving bodies, and brake control means operated according to the axial movement of said axially movable body.

2. In a vehicle brake system, in combination, a driving body, a driven body, resilient and yielding means for transmitting motion between said bodies and providing for different degrees of relative movement between said bodies, an axially movable body, means for moving said axially movable body to different positions according to the degree of relative movement between said driving and said driven bodies, contacts operated according to the position of said axially movable body, and brake control means controlled by said contacts.

3. In a vehicle brake system, in combination, a driving body, a driven body, resilient and yielding means for transmitting motion between said bodies and providing for different degrees of relative movement between said bodies, an axially movable body, means for moving said axially movable body to different positions according to the degree of relative movement between said driving and driven bodies, a brake cylinder, means for effecting a supply of fluid under pressure to said brake cylinder, electroresponsive cut-off and release valve means for controlling the supply to said brake cylinder, normally open contacts, a source of current supply, circuits connecting said source to said electroresponsive valve means and to said contacts, and means for closing certain of said contacts for one position of said axially movable body to cause said valve means to cut off said supply and for closing the other of said contacts for another position of said axially movable body to cause said valve means to release fluid under pressure from said brake cylinder.

4. In a vehicle brake system, in combination, a driving member, a driven member, a plurality of springs certain of which are adapted to transmit motion between said driving and driven members and certain of which are adapted to be compressed variable degrees when said driven member tends to overspeed said driving member due to deceleration of the vehicle, a brake cylinder, means for effecting a supply of fluid under pressure to said brake cylinder, cut-off and release valve means, and means for effecting operation of said cut-off valve means to cut off said supply when said springs are compressed to one degree and for effecting operation of said release valve means to release fluid under pressure from said brake cylinder when said springs are compressed to a greater degree.

5. In a vehicle brake system, in combination, a driving member, a driven member, a spring for transmitting motion between said driving member and said driven member to cause rotation of said driven member, a second spring adapted to be compressed different degrees when said driven member tends to overspeed said driving member, normally open contacts, and means for effecting closing of certain of said contacts when said second spring is compressed to one degree and for closing the other of said contacts when said second spring is compressed to a greater degree.

6. A brake control device comprising in combination, a driving shaft, a fly wheel body rotatably disposed on said shaft, a plurality of springs interposed between said shaft and fly wheel body and adapted to transmit motion between said shaft and fly wheel body and to provide for relative movement between said bodies when said fly wheel body tends to overspeed said shaft, an axially movable body also disposed on said shaft, cams carried by said fly wheel body and adapted to move said axially movable body to different positions when said fly wheel body overspeeds said driving shaft, normally open contacts, and means for closing certain of said contacts when said axially movable body is moved to one position and for closing the other of said contacts when moved to a second position.

7. In a vehicle brake system, the combination with a brake cylinder and means for supplying fluid under pressure thereto, of a movable body operable according to the speed of the vehicle, a second movable body, yielding means for transmitting movement between said bodies, means acting upon said yielding means when one of said bodies tends to overspeed the other to cause said yielding means to yield to permit relative movement between said bodies, and means rendered operable upon a certain relative movement between said bodies for cutting off the supply of fluid under pressure to said brake cylinder.

8. In a vehicle brake system, the combination with a brake cylinder and means for supplying fluid under pressure thereto, of a rotatable body adapted to be rotated according to the speed of the vehicle, a second rotatable body, yielding means, means whereby said second body is rotated in accordance with the rotation of said first body through said yielding means and said yielding means is compressed when one of said bodies tends to overspeed the other, to permit relative movement between said bodies, means operable to cut off the supply of fluid under pressure to said brake cylinder, and means operable upon a certain differential movement between said bodies for controlling operation of said cut-off means.

9. In a vehicle brake system, the combination with a brake cylinder and means for supplying fluid under pressure thereto, of a rotatable body adapted to be rotated according to the speed of the vehicle, a second rotatable body, yielding means, means for rotating said second body in accordance with the rotation of said first body through said yielding means and being adapted to compress said yielding means when one of said bodies tends to overspeed the other, whereby said bodies move relative to each other, means operable to cut off the supply of fluid under pressure to and release fluid pressure from said brake cylinder, and means for operating said last means according to the degree of differential movement between said bodies.

10. In a vehicle brake system, the combination with a brake cylinder and means for supplying fluid under pressure thereto, of a rotatable body adapted to be rotated according to the speed of the vehicle, a second rotatable body, resilient means, means for rotating said second body through said resilient means in accordance with the rotation of said first body and being adapted to compress said resilient means when one of said bodies tends to overspeed the other, to permit relative movement between said bodies, means operable to cut off the supply of fluid under pressure to and release fluid pressure from said brake cylinder, and means responsive to one degree of differential movement between said bodies for effecting the cutting off of the supply of fluid under pressure to said brake cylinder and responsive to another degree of differential movement between said bodies for effecting the release of fluid under pressure from said brake cylinder.

11. In a vehicle brake apparatus, the combination with a brake cylinder and valve means for controlling the supply of fluid under pressure to and its release from said brake cylinder, of a body rotatable according to the speed of the vehicle, a second body adapted to be rotated by said first body, resilient means adapted to transmit motion between said two bodies, and means for tensioning said resilient means when one of said bodies is urged to a speed greater than that of the other, and means rendered operable when said resilient means is tensioned for actuating said valve means.

12. In a vehicle brake apparatus, the combination with a brake cylinder and valve means for controlling the supply of fluid under pressure to and its release from said brake cylinder, of a body rotatable according to the speed of the vehicle, a second body adapted to be rotated by said first body, resilient means adapted to transmit motion between said bodies, means for deflecting said resilient means when one of said bodies is urged to a speed greater than that of the other, and means actuated in accordance with the deflection of said resilient means for effecting operation of said valve means to cut off the supply of fluid under pressure to said brake cylinder at one time and to release fluid under pressure from said brake cylinder at another time.

13. In a vehicle brake apparatus, the combination with a brake cylinder and valve means for controlling the supply of fluid under pressure to and its release from said brake cylinder, of a plurality of rotatable bodies, one of said bodies being adapted to be rotated according to the speed of the vehicle, yielding means, means for rotating the other of said bodies through action of said yielding means in response to rotation of the first of said bodies, said yielding means being adapted to be compressed when one of said bodies tends to overspeed the other, whereby said bodies move relative to one another, and means whereby a small relative movement between said bodies effects one operation of said valve means and a large relative movement between said bodies effects another operation of said valve means, to control the degree of pressure in said brake cylinder.

14. In a vehicle brake system, the combination of a plurality of rotatable bodies, spring means, one of said bodies being adapted to rotate the other of said bodies through action of said spring means, means for compressing said spring means when one of said bodies is urged toward a greater speed than the other, and brake control means adapted to be actuated in accordance with the degree of compression of said spring means.

15. In a vehicle brake system, brake control means, the combination of a plurality of rotatable bodies, one of said bodies being adapted to rotate the other of said bodies, spring means carried by one of said bodies, and means operable to deflect said spring means upon differential rotary movement between said bodies due to differences in impelling forces, means for transforming said differential rotary movement into corresponding axial movement, and means for controlling said brake control means according to said axial movement.

16. In a vehicle brake system, brake control means, the combination of a plurality of rotatable bodies, one of said bodies being adapted to rotate the other of said bodies, spring means rotatable with one of said two bodies, means for deflecting said spring means upon differential movement between said two bodies when one body is urged toward a greater speed than the other, and means whereby said differential movement between said two bodies causes different degrees of axial movement of another of said bodies to operate said brake control means.

17. In a vehicle brake system, the combination of a plurality of rotatable bodies, spring means, one of said bodies being adapted to rotate the other of said bodies through said spring means, means for compressing said spring means upon differential movement between said last mentioned bodies when one body is urged toward a greater speed than the other, contact means, means operable upon differential movement in a given direction between said bodies for operating said contact means according to the degree of differential movement, and brake control means adapted to perform a lap operation in response to one operation of said contact means and a release operation for another operation of said contact means.

18. In a vehicle brake system, the combination of two rotatable bodies, spring means, one of said bodies being adapted to rotate the other of said bodies through said spring means, means for compressing said spring means to at least two different degrees upon at least two degrees of differential movement between said bodies when one body is urged toward a greater speed than the other, two normally opened contacts, means for closing one of said contacts upon one degree of differential movement between said bodies and for closing the other of said contacts upon a second degree of movement between said bodies, and brake control means responsive to closing of said first one of said contacts for performing a lap operation and responsive to closing of said other of said contacts for performing a release operation.

19. In a vehicle, the combination with means for changing the speed of the vehicle, a plurality of rotatable bodies, yielding means adapted to act as a coupling between said bodies, means for deflecting said yielding means upon relative movement between said rotatable bodies, whereby said bodies move relative to each other, and means responsive to the degree of relative movement between said bodies for controlling said first means.

RANKIN J. BUSH.